May 5, 1931.  C. H. CLAUDEL  1,803,461
INTERNAL COMBUSTION ENGINE
Filed April 6, 1927
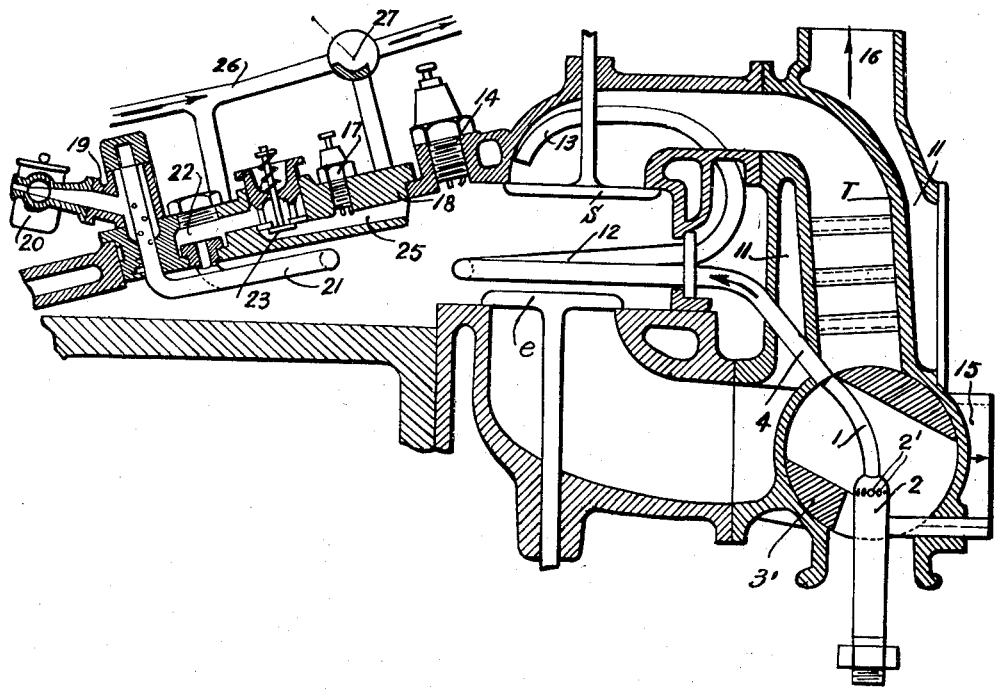
Inventor
Charles Henri Claudel
By
Attorney Patented May 5, 1931

1,803,461

UNITED STATES PATENT OFFICE

CHARLES HENRI CLAUDEL, OF VEUXHAULLES, FRANCE

INTERNAL-COMBUSTION ENGINE

Application filed April 6, 1927, Serial No. 181,469, and in France December 24, 1926.

Very unsatisfactory results, which are more particularly felt during the slow speed periods, are obtained by supplying the carburettors of the usual type, and more especially spray or emulsion type carburettors in explosion motors with heavy, nonvolatile fuels having a lower ignition point than the light gasolenes commonly used in the known carburettor types. As a result of the throttling of the passage-way of the mixture to the motor, the operation of the latter becomes irregular, and, by falling below a certain speed, may even bring the motor to a full stop. The main reason of this disturbance resides in the fact that the generally high speed of flow of the mixture within the carburettor falls suddenly to a sharply reduced speed within the induction conduit or suction socket of the motor; this considerable loss of speed promotes an immediate segregation of the vesicles from the air, forming sediments which are only partially, or even not at all used in the motor.

One feature of the invention consists in the fact, that in addition to the usual induction conduit suppling the motor at full speed, I provide an auxiliary feed tube or conduit of a small diameter, receiving the carburetted mixture at the outlet of the carburettor and carrying the same at high speed close to the admission valves of the motor, to a point situated as closely as possible to the ignition device. In this manner I not only prevent any deposit of the liquid which might occur due to the reduced speed of flow, but I also maintain, even during slow-speed operation, a supply of a perfectly explosible mixture in the vicinity of the ignition device; I furthermore reduce hereby the dilution of the combustible mixture of the gaseous contents in the combustion chamber, contents which are formed to a larger or lesser extent by the gases burnt during the preceding explosions. Under these conditions the starting of the motor without heating is effectively furthered, and its operation at slow speed fully secured.

The smaller auxiliary admission conduit, according to the fuel used, is preferably heated more or less by disposing same within a by-pass derived from the exhaust piping, whereby the heating effect rises in proportion to the diminution of the speed of the motor. The heating of the auxiliary admission conduit may also be effected by having the same pass through the combustion chamber proper. It will be understood, however, that in order to maintain the highest possible power of the motor, the heating of the main admission conduit is held as low as possible.

The above described arrangement at the same time presents the following advantage; when the carburettor is mounted near the bifurcation of the conduit, the closing of the valve or throttling element imparts to the gaseous stream of the carburetted mixture a dissymmetrical course in respect of said conduit whereby a condensation of the stream takes place, and a liquid streak is formed which develops a tendency either to run longitudinally along the wall on a single side thereof, or to spread in various directions and in quantities which vary according to the speed of the motor and the temperature of the admission conduit. This inconvenience is effectively abolished by the provision of an auxiliary conduit having a reduced diameter, whereby the slow-down mixture flows next to the admission valve.

A further feature of the invention consists therein that the mixture, and more particularly the mixture in the auxiliary conduit which has been superheated by the explosion, is treated by momentary compressions, by electric spark shocks, or by a catalyzing process.

In this manner I realize a cracking of the mixture, which is still furthered by the suspension of combustible vesicles in an atmosphere not containing a quantity of air sufficient to permit a spontaneous ignition. By this method I also realize a stabilization of the mixture, or in other words I impart such a molecular constitution to the mixture that its condensation will be prevented.

The accompanying drawing is a vertical central cross-section of the apparatus for carrying out the invention.

In the drawings 2 is a full speed nozzle with fuel output orifices 2' and 1 is a slow speed nozzle. The operation of these nozzles will depend upon the position of throttle valve 3' which may connect the full speed nozzle 2 with main intake conduit T or with auxiliary conduit 4, when the internal combustion engine is running at full load or low load respectively. The main conduit T leads to the cylinder and the auxiliary conduit 4 passes through an exhaust chamber 11. After its passage through the combustion chamber proper of the cylinder, opens at 13 above the admission valve s in a point preferably situated as close as possible the spark plug 14. The heating capacity of the exhaust chamber 11. enveloping both, the small diameter conduit 4 and the main admission conduit T, may be controlled by a valve mounted upon the exhaust conduit; when this valve is closed the exhaust gases, after their passage through chamber 11, escape by the by-pass conduit 16. This valve may also be arranged so as to be rigid with, or to be connected in a suitable manner to the throttle 3'. A set of small tubes leading the exhaust gases may be provided through the main conduit itself, as shown in the drawing, to lead the exhaust gases to directly heat the mixture.

This figure illustrates a double ignition safety device whereby, during the extreme slow speed periods, the operation is secured by means of an auxiliary mixture which is ignited by a spark plug 17 operating in parallel with the main spark plug 14. This device is preferably mounted upon a sparking anvil 18 which is not cooled off to the same degree as the cylinder walls. This sparking anvil is fed either by a special carburettor 20 or by tapping the carburetted mixture supplied by the slow speed device of the main carburettor; this mixture, after being flown through a superheater tube 21 adapted within the combustion chamber, returns to the sparking anvil chamber 22, flows through the admission valve and enters finally the cylinder through channel 25 whereby it is ignited by the auxiliary spark plug 17. The channel 25 preferably opens in proximity of the main spark plug 14. The temperature of the spark plug anvil is preferably regulated by circulating a suitable refrigerating agent. Such a circulation wherein the intensity is regulated by the by-pass 27 is schematically illustrated at 26.

Between the conduit 19 and the admission valve 23, I may insert a compressor element whereby the safety mixture is subjected to momentary compressions thus realizing, as described above, a stabilization and preventing condensing of this mixture. A similar result can be obtained in filling the tube 21 with porous absorbing material, (such as coke) or with catalyzing elements.

I claim:

1. In an explosion motor with a main ignition device, a safety sparking device mounted upon the cylinder head and forming sparking anvil and inspection port, a conduit therein, a valve in said conduit, and means supplying a fuel mixture to one end of said conduit, the opposite end thereof opening in proximity of the main ignition device.

2. In an explosion motor with a main ignition device, a safety ignition device, a conduit therein one end thereof opening into the cylinder in proximity of the main ignition device, an admission valve in said conduit, a spark plug in the same conduit between said valve and said end opening into the cylinder, means supplying a fuel mixture to the other end of said conduit.

3. In an explosion motor with a main ignition device a safety ignition device, a conduit therein one end thereof opening into the cylinder in proximity of the main ignition device, an admission valve in said conduit, a spark plug in the same conduit between said valve and said end opening into the cylinder, in addition to the usual induction conduit an auxiliary feed tube of small diameter disposed to receive the slow speed mixture and to feed same into the other end of said conduit.

4. In an explosion motor with a main ignition device, a safety ignition device, a conduit therein one end thereof opening into the cylinder in proximity of the main ignition device, an admission valve in said conduit, a spark plug in the same conduit between said valve and said end opening into the cylinder, in addition to the usual induction conduit an auxiliary feed tube of small diameter disposed to receive the slow speed mixture and to feed same into the other end of said conduit, at least a part of said tube being disposed into the cylinder of the engine.

In testimony whereof, I have signed my name to this specification.

CHARLES HENRI CLAUDEL.